United States Patent [19]

Bromley et al.

[11] Patent Number: 4,911,830

[45] Date of Patent: Mar. 27, 1990

[54] FLUORESCENT PIGMENT CONCENTRATES

[75] Inventors: Henry T. Bromley, Coral Springs, Fla.; Craig J. Bastian, Arlington, Tex.

[73] Assignee: PMS Consolidated, Somerset, N.J.

[21] Appl. No.: 199,280

[22] Filed: May 26, 1988

[51] Int. Cl.$^4$ .............................................. C09K 11/06
[52] U.S. Cl. .................. 252/301.16; 106/272
[58] Field of Search .................... 252/301.16; 106/272

[56] References Cited

U.S. PATENT DOCUMENTS

| | | | |
|---|---|---|---|
| 3,156,575 | 11/1964 | Gagliano et al. | 106/288 |
| 3,197,424 | 7/1965 | Larson | 260/16 |
| 3,230,178 | 1/1966 | Bennahmias | 252/301.3 |
| 3,252,820 | 5/1966 | Vignolo et al. | 106/487 |
| 3,666,675 | 5/1972 | Dori et al. | 252/301.2 |
| 3,755,244 | 8/1973 | Hart | 260/41 |
| 3,767,444 | 10/1973 | Zeisberger | 106/272 |
| 3,796,668 | 3/1974 | Hickcox | 252/301.2 |
| 3,873,390 | 3/1975 | Cornell et al. | 156/230 |
| 3,922,232 | 11/1975 | Schein | 252/301.2 |
| 3,930,063 | 12/1975 | Miller et al. | 427/54 |
| 3,948,740 | 4/1976 | Phalangas | 204/159.23 |
| 3,960,755 | 6/1976 | Beachem et al. | 252/301.16 |
| 3,970,660 | 7/1976 | Bollyky | 260/295.1 |
| 3,978,036 | 8/1976 | Pollard | 264/140 |
| 3,991,044 | 11/1976 | Conley | 260/176 |
| 4,002,593 | 1/1977 | Jones | 260/40 |
| 4,115,377 | 9/1978 | Putney | 260/151 |
| 4,116,924 | 9/1978 | Peabody, I | 260/40 |
| 4,127,422 | 11/1978 | Guzi, Jr. et al. | 106/308 |
| 4,168,180 | 9/1979 | Peabody, II | 106/308 |
| 4,172,063 | 10/1979 | O'Brill | 260/29.6 |
| 4,176,205 | 11/1979 | Molina | 427/1 |
| 4,196,253 | 4/1980 | Spence | 428/323 |
| 4,442,017 | 4/1984 | Blumberg et al. | 252/301.2 |
| 4,466,900 | 8/1984 | Horiacher et al. | 252/301.2 |
| 4,500,362 | 2/1985 | Takahashi et al. | 106/309 |
| 4,640,953 | 2/1987 | Goss | 524/476 |
| 4,657,695 | 4/1987 | Chiang | 252/301.3 |
| 4,670,505 | 6/1987 | Craig | 524/704 |

OTHER PUBLICATIONS

Richter, Jr., "Fluorescent Dyes and Pigments", Focus Section, Europlastics Monthly, (Oct. 1973).
Kirk-Othmer Encyclopedia of Chemical Technology, 3rd Ed., vol. 20, (1982), pp. 768 and 773 to 781.
Brady, George S., et al., "Materials Handbook", 12th Ed., p. 721.
Chemical Technology: An Encyclopedia Treatment, vol. II, Barnes & Noble, Inc., pp. 194 and 195.

Primary Examiner—John F. Niebling
Assistant Examiner—Steven P. Marquis
Attorney, Agent, or Firm—Fisher, Christen & Sabol

[57] ABSTRACT

A low plate-out fluorescent pigment concentrate containing from about 5 up to about 40 weight percent of a fluorescent pigment, based upon the total weight of the fluorescent pigment concentrate, about 5 to about 20 weight percent of an inorganic filler, based upon the total weight of the fluorescent pigment concentrate, and a minimum of 2 up to about 10 weight percent of a silica gel or a precipitated silica, based upon the total weight of the fluorescent pigment concentrate. The inert filler has an average particle size of about 2 microns or less. There is also from about 1 to about 10 weight percent of an organic polymer selected from the group consisting of (i) an oxidized polyethylene wax, (ii) an unoxidized polyethylene wax, (iii) a low molecular weight ethylene-acrylic acid copolymer, (iv) a bivalent metal salt of (1) or (iii), and (v) a combination of at least two of (i), (ii), (iii) and (iv), based upon the total weight of the fluorescent pigment concentrate. The remainder of the concentrate is an ethylene polymer up to 50 weight percent, based upon the total weight of the fluorescent pigment concentrate. The molecular weight of the ethylene polymer is substantially greater than that of the oxidized or unoxidized polyethylene wax.

17 Claims, No Drawings

FLUORESCENT PIGMENT CONCENTRATES

BACKGROUND OF THE INVENTION

1. Field Of The Invention

The invention relates to low plate out fluorescent pigment concentrates t methods of preparing such fluorescent pigment concentrates, and to the methods of formuaating such fluorescent pigment concentrates with polyolefins.

2. Background Art

Richter, J., "Fluorescent Dyes And Pigments", Focus Section, Europlastics Monthly, (Oct. 1973), is a general description of fluorescent dyes and pigments. Combinations of fluorescent dyes with white pigments, such as, titanium dioxide, are disclosed. Fluorescent dyes tend to cause cracking in polyethylene.

U.S. Pat. No. 3,796,668 discloses organic fluorescent dye colored PVC and its copolymers by way of enhanced initial fluorescent appearance of the product and by way of improvements in the resistance of the dye to fading upon exposure to light such as sunlight. These improvements can be achieved by combining as by blending a sufficient amount of chlorinated polyethylene with the PVC or its copolymers. If desired, additional improvement in fluorescent appearance and fade resistance can be achieved if certain vinyl resin stabilizers are added to the formulation. The addition of a non-mercaptide organotin or a barium-cadmium-zinc or a strontium-zinc stabilizer, the latter two categories of stabilizer preferably being used in combination with a chelator, will provide superior results than can be obtained with other types of vinyl resin stabilizer.

U.S. Pat. No. 3,922,232 discloses a fluorescent colorant comprising particles of a resinous precondensate colored with a fluorescent dye-stuff. The precondensate is a nontacky solid soluble in acetone and dimethylformamide at 25° C., having a softening point of at least about 70° C. and being derived from about 0.5 to about 2.0 moles of at least one aliphatic, aromatic or alicyclic polyfunctional acid components selected from the group consisting of carboxylic acids, esters and anhydrides, and one mole of at least one polyhydroxy compound selected from the group consisting of aliphatic polyhydroxy compounds and tris-(hydroxyalkyl) isocyanurates. At least one of the polyfunctional acid component or polyhydroxy compound has a functionality greater than 2. Additives such as titanium dioxide, low molecular weight polyethylene and ethylene copolymers (for example, ethylene-acrylic acid copolymers), and colloidal silica can be added to the precondenate or to the final colorant. The fluorescent colorants can be used for coloring polyethylene.

U.S. Pat. No. 4,172,063 discloses an abrasive resistant, reflective exterior marking composition useful for application to a substrate, such as, a cementitious substrate. The composition includes a vehicle component including an organic thermoplastic, resinous, film-forming material in an amount sufficient to form a tenacious bond with the substrate, a high visibility, fluorescent pigment in an amount sufficient to produce flourescence, a sufficient quantity of an extender for the vehicle so as to render the composition readily applicable to the substrate by brushing or spraying or troweling, and the remainder being an inorganic aggregate material including a sand component, hydraulic cement in a cementitious amount and a glass fiber strand component. The hydraulic cement is Portland cement in the amount of about 0.1 to 500 parts by weight. The sand component is sand in the amount of about 0.1 to 500 parts by weight. The fluorescent pigment is present in at least about 0.10 parts by weight. The film-forming material is present in an amount of about 0.01 to 300.0 parts by weight. The glass fiber strand component is present in an amount of about 0.1 to 50.0 parts by weight. The extender includes a water-reducing agent in the amount of about 0.03 to 10.0 parts by weight and water in the amount of about 0.04 to 200.0 parts by weight.

U.S. Pat. No. 4,466,900 discloses a process for the preparation of a concentrated, storage-stable liquid formulation, which contains an anionic fluorescent brightener. The process includes treating a crude aqueous solution or dispersion of an anionic fluorescent brightener containing a sulfo group, with a semipermeable membrane which contains ionic groups and has a pore diameter of 1 to 500 A, so as to remove salts and synthesis by-products having molecular weights less than 500 and to remove part of the water. The concentrated preparation can be treated with formulation assistants, e.g., surfactants, and further additives, e.g., dyeing assistants. The liquid formulations can be used for the fluorescent brightening of natural and synthetic fiber material.

U.S. Pat. No. 4,657,697 discloses a method for the preparation of a fluorescent ink layer for a fluorescent thermal transfer sheet. The method includes first forming a solution of a mixture comprising at least one acidic monomer, at least one basic monomer and at least one fluorescent dye. An emulsion of the solution is formed and the emulsion is polymerized.

U.S. Pat. No. 4,442,017 discloses a composition which is a solid uniform blend and which includes one or more additives for organic polymers. Each additive independently is normally solid at room temperature and is an anti-oxidant, stabilizer, lubricant, flameproofing agent, slip agent, anti-blocking gent or anti-static agent. The composition also includes a compound which gives a detectable response to irradiation in the presence of the additives. The additives and the irradiation-responsive compound are in intimate cohesive contact with one another. The irradiation-response compound can be a fluorescent compound.

U.S. Pat. No. 3,230,178 discloses a bright pastel composition composed of a white pigment having n index of refraction of at least about 1.8 to 2.0, a daylight fluorescent pigment in an amount sufficient to impart a pastel coloration to the white pigment, but insufficient to render the composition daylight fluorescent, and a binder for the pigments. The pigment can be titanium dioxide.

SiLCRON G-100 is an aerosol-type synthetic particle silica without any surface treatment which is known to be useful in polyethylene coatings as a flatting agent, for example, to be useful in plastics for reducing plate-out and preventing blooming, and to be useful in plastics as an aid to the dispersing of other pigments and PVC film. "SiLCRON Fine Particle Silica, SiLCRON G-100", SCM Corp., Baltimore, Md.

U.S. Pat. No. 3,930,063 discloses a method wherein a large particle sized silica sol and a fluorescent dye are mixed together and applied as a coating to a substrate with the application monitored during coating by a light which renders the fluorescent dye visible. If the coating is blotched or uneven, corrections can be made during the run to provide a uniform coating.

U.S. Pat. No. 4,176,205 discloses a fingerprint powder for developing latent fingerprints therewith. Such power is composed of a powder carrier, especially a mixture of silica and talc, containing a coloring agent, preferably a fluorescent dye. The silica for example is Cab-O-SIL M5, which is a fumed silica.

U.S. Pat. No. 3,960,755 discloses a composition useful for marking and identification purposes. The composition includes a non-fluorescent solvent, a fluorescent material and a water-insoluble, tacky, amorphous, resinous material.

U.S. Pat. No. 3,666,675 discloses a method of producing luminescence using certain complex luminescent materials.

U.S. Pat. No. 3,970,660 discloses a chemiluminescent system comprising (1) derivatives of a polycarbonyl compound substituted with at least one nitrogen-containing hetero group and which may have an alkanol or amine substituent, (2) a hydroperoxide compound, (3) a diluent, and (4) a fluorescent.

BROAD DESCRIPTION OF THE INVENTION

An object of the invention is to provide fluorescent pigment concentrates which provide reduced plate-out of the fluorescent pigment during compounding and more importantly during the molding of the polyolefin product. Another object of the invention is to provide a method for preparing the low plate out fluorescent pigment concentrates. A further object of the invention is to provide molded polyolefin formulations prepared utilizing the low plate-out fluorescent pigment concentrates.

The invention involves a low plate-out fluorescent pigment concentrate (A), which includes from about 5 up to about 40 weight percent of a fluorescent pigment, based upon the total weight of the fluorescent pigment concentrate, about to about 20 weight percent of an inert inorganic filler (B), based upon the total weight of the fluorescent pigment concentrate, and a minimum of 2 up to about 10 weight percent of a silica gel or a precipitated silica (C), based upon the total weight of the fluorescent pigment concentrate. The inert filler has an average particle size of about 2 microns or less and preferably has an average particle size of about 1 micron or less. There is also from about 1 to about 10 weight percent of an organic polymer (D) selected from the group consisting of (i) an oxidized polyethylene wax, (ii) an unoxidized polyethylene wax, (iii) a low molecular weight ethylene acrylic acid copolymer, (iv) a bivalent metal salt of (i) or (iii), and (v) a combination of at least two of (i), (ii), (iii) and (iv), based upon the total weight of the fluorescent pigment concentrate. The remainder of the concentrate is an ethylene polymer (E) up to 50 weight percent, based upon the total weight of the fluorescent pigment concentrate. The molecular weight of the ethylene polymer is substantially higher than that of the oxidized or unoxidized polyethylene wax.

Fluorescent pigments by themselves give unacceptable plate-out levels.

The invention includes a process for preparing the low plate-out fluorescent pigment concentrate. The process includes:

(I) dry blending components (A), (B), (C), (D), and (E), preferably using high-intensity mixing conditions, but however not subjecting the surfaces of the pigment particles to such high shear so as to materially effect the color characteristics of the pigment particles; and (II) melt mixing the dry blended mixture at a temperature of 425° F. or lower and optionally forming the melt-mixed material into a form useful for fabrication. Preferably the forming of the melt-mixed material involves the steps of:

(a) forming the melt-mixed material into strands;

(b) cooling the strands; and (c) pelletizing the strands.

It has been found that the use of too high of shear should be avoided as it may adversely effect the color characteristics of the fluorescent pigments. So too high of shear in the dry blending step should be avoided.

The invention also includes the process of incorporating the invention fluorescent pigment concentrate into polyolefin and molding the concentrate-polyolefin composition into molded articles. The invention further includes molded articles of polyolefins containing the invention fluorescent pigment concentrate. The homopolymers and copolymers of the polyolefins, preferably polyethylene and polypropylene, can be used for the molded articles. Preferably the copolymers are composed of linear ethylene and at least one olefinic monomer, such as, 1-butene, 1-hexene and 1-octene.

DETAILED DESCRIPTION OF THE INVENTION

The fluorescent pigment can be present in an amount of about 5 to about 40 weight percent, preferably about 20 to about 38 weight percent, and most preferably about 35 weight percent, based upon the total weight of the invention product. They must also be sufficiently heat stable. Combinations of two or more fluorescent pigments can be used.

Fluorescent dyes as such are outside of the scope of the invention. The invention also does not encompass phosphorescent dyes or pigments.

Fluorescent pigments are also referred to as daylight fluorescent colors. The term pigment in this context is really incorrect since by definition it is understood to mean pure unextended inorganic or organic colorants which, unlike dyes, are insoluble in solvents of all kinds. Daylight fluorescent colors with few exceptions are really not true pigments but are instead solid solutions of fluorescent dyes in transparent synthetic resins which are finely ground to a particle size in the range of 2 to 5 microns. These pigments could alternatively be described as transparent plastic materials, colored with fluorescent dyes. The carrier materials are often melamine formaldehyde or triazine formaldehyde resins modified with aromatic sulphonamide resins. These materials are glass-like in character and are so brittle that they can be ground to an extremely fine consistency. Often-used carrier materials are also polyesters and polyamides. Many of these carrier resins behave as thermoplastics, though a number are thermoset materials. They contain fluorescent dyes of the type, for example, 4-amino-naphthalimide (yellow) or rhodamine (red-blue/red) singly or blended together. There are no genuine blue or green fluorescent dyes; for these, phthalocyanine pigments combined with optical brighteners or with yellow fluorescent dyes are employed, yielding shades which, though clearly more brilliant than those obtained with normal pigments, do not however attain the luminosity of other fluorescent pigments.

The fluorescent pigments can be said to be fluorescent dyes in molecular solution in the carrier resin.

Examples of fluorescent dyes useful in preparing the fluorescent pigments are the fluorescent brighteners containing sulfo groups, in particular stilbene fluorescent brighteners, especially those of the type of the bis-triazinylaminostilbenedisulfonic acids, the bis-styrylbiphenyls, the bis-styrylbenzenes and the bis-triazolylstilbenedisulfonic acids. The fluorescent brighteners containing sulfonic acid groups can be in the form of their metal salts, for example, lithium, potassium, magnesium or sodium salts, and also ammonium, amine or alkanolamine salts. Fluorescent brightener compounds which have been partially acidified or fluorescent brighteners in the form of the free acid can be used. Any of the fluorescent brighteners containing sulfo groups of U.S. Pat. No. 4,466,900 can be used. The pertinent portions of U.S. Pat. No. 4,466,900 are incorporated herein by reference.

Other examples of fluorescent dyes which can be used to prepare the fluorescent pigments are the fluorescent naphthalimide dyes for example, Morton Fluorescent Yellow G (Color Index 75), Fluorol 7GA (Color Index-Fluorescent brightening agent 75), Calcofluor Yellow (Color Index-Fluorescent brightening agent No. 4) and Azosol Brilliant Yellow 6 GF (Color Index-Solvent Yellow 44), and the fluorescent cuomarin dyes, for example, Calcofluor White RW (Color Index-Fluorescent brightening agent 68) and Blancophor White AW (Color Index-Fluorescent brightening agent 68). Other useful fluorescent dyes include Rhodanine B, Rhodanine 6 GDN, Auramine, Eosine G, Calcofluor White ST, Pontamine White RT, Pontamine White BTS, Rhodamine Bx, Phthalocyamine, Alkali Blue G, Phthalocyamine, Rhoamine 7G, Rhodamine FB, Rhodamine S, Rhodamine 5G, Bright Yellow 3G, Teteramethyl Rhodamine, Rhodamine FG, Rhodamine F4G, Fanal Pink D, Fanal Violet D, Flexo Yellow 110, Lumogen Yellow D, Fluorol Green Gold, Fluorol Yellow and Thermoplast F-Orange.

The preferred fluorescent pigments are those of the ZX series of fluorescent pigments by Day-Glo.

The Z series of fluorescent pigments of Day-Glo were marginal in results; the S series of fluorescent pigments of Day-Glo and the K-600 series of fluorescent pigments of Radiant Colors was unacceptable in results.

The fluorescent pigments can be prepared with the aid of dyeing assistants.

In contrast to normal pigments, the fastness to light of fluorescent pigments is only moderate. This is a result of the poor light fastness of the fluorescent colorants they contain; the carrier resins themselves being very stable to light. The addition of UV stabilizers, e.g., benzophenone and benzotriazole classes, gives marked improvements. Such products are frequently already present in the fluorescent pigments.

Many of the commercially available fluorescent pigments recommended for plastics are heat-stable only up to moderate temperatures because of the limited thermal stability of the carrier resins. These temperatures for short dwell times range between 180° and 230° C. according to the type of carrier resin and its degree of cross-linking. Processing temperatures in such range suffice for the final plastic products where they are molded at a temperature of up to 425° F., and preferably 400° F. (about 205° C.) or less.

The fluorescent pigments must not be subjected to too high of shear in the dryblending operation as it may adversely effect the color characteristics of the fluorescent pigments.

The inorganic, inert filler can be present in an amount of about 5 to about 20 weight percent, preferably about 10 to about 15 weight percent, and most preferably about 12 to about 13 weight percent, based upon the total weight of the invention concentrate. Higher amounts of filler possibly can be used in some instances. The inert filler must have an average particle size of about 2 microns or less and preferably of about 1 micron or less. The preferred inorganic, inert fillers are precipitated barium sulfate (average particle size of about 0.7 micron). Natural barium sulfate having an average particle size of about 4 microns was ineffective. Buca clay (average particle size of about 0.4 micron) worked whereas China clay (average particle size of greater than 2 microns) was ineffective. Calcium carbonate having an average particle size of about 3 microns, diatomaceous earth having an average particle size of about 5 microns and talc having an average particle size of about 3 microns were ineffective.

The useful inorganic, inert fillers usually have a specific gravity of 2 to 4.5.

The silica gel or precipitated silica can be present in an amount of a minimum of 2 to about 10 weight percent, and preferably in an amount of at least 2 to about 6 weight percent, based upon the total weight of the invention concentrate. The preferred silica gel is SiLCRON G-100 and the preferred precipitated silicas are SIPERNAT 50 and TS-100 (DeGussa). Combinations of silicas gels and/or precipitated silicas can be used.

SiCRON G-100 is an aerogel-type synthetic particle silica without any surface treatment which is marketed by SCM Corp. of Baltimore, Md. 21230. Typical physical properties of SiLCRON G-100 are:

| Specific Gravity | 2.1 |
| Density, lbs./Gal. | 17.5 |
| Bulking Value, gal./100 lbs | 5.7 |
| Dry Bulk Density, lbs./cubic ft. in Package | 7 |
| Loss on Ignition (1200° C.), % | 6.0 |
| $SiO_2$, Ignited Basis (1200° C.), % | 99.7 |
| pH, (5% slurry) | 7.0 |
| Average Particle Size, micron (Coulter Counter Method) | 3.0 |
| Oil Absorption, lbs./100 lbs. | 270 |
| Surface Area, $m^2/g$ | 275 |
| Typical Fineness of Grind (Hegman Reading) | 6 to 7 |

SIPERNAT 50 is a precipitated silica. Typical physical properties of SIPERNAT 50 are:

| | SIPERNAT 50 |
|---|---|
| BET Surface Area, $m^2/g$ | 450 |
| Average Agglomerate Size, $\mu m$ | 50 |
| Tapped Density g/l | 200 |
| lbs/c. ft. | 12.5 |
| pH | 7 |
| DBP Absorption, % | 340 |
| Sieve Residue (acc. Mocker 45 $\mu m$), % | 0.5 |
| Moisture (2 hrs at 105° C.) | 6 |
| Ignition Loss (2 hrs at about 1000° C.) | 5 |
| $SiO_2$, % | 99 |
| $Na_2O$, % | 0.3 |
| $Fe_2O_2$, % | 0.03 |
| $SO_2$, % | 0.4 |

Silica gels, precipitated gels and fumed silicas are defined in *Kirk-Othmer Encyclopedia Of Chemical Tech-*

*nology*, 3rd Ed., Vol. 20, (1982) pages 768, 773 to 776 and 779 to 781.

Fumed silicas (namely, SIPERNAT 22, AEROSIL 200 VS, OX-50, CAB-O-SIL AND TS-100) evaluated in place of the silica gel, also in conjunction with different fillers, proved to be ineffective.

The organic polymer can be present in an amount of about 1 to about 10 weight percent, preferably about 3 to about 8 weight percent, and most preferably about 5 weight percent, based upon the total weight of the invention concentrate. Various polymers have been found not to work well within the scope of the invention, i.e., too much plate-out occurred.

Combinations of the useful organic polymers can be used.

The organic polymer can be an oxidized or unoxidized polyethylene wax preferably having a molecular weight of about 1000 to about 5000. The organic polymer (wax) has a molecular weight of less than 10,000.

The organic polymer can be a low molecular ethylene-acrylic acid copolmmer, preferably having a molecular weight of about 1000 to about 5000. The phrase "low molecular ethylene acrylic acid copolymer" includes those copolymers containing from about 1 to about 99 weight percent (preferably about 20 to about 80 weight percent) of ethylene and about 99 to about 1 weight percent (preferably about 80 to about 20 weight percent) of acrylic acid. The ethylene-acrylic acid copolymer, termed 540A, of Allied Chemical was particularly effective.

The bivalent metal salts of the organic polymer can be those of magnesium, calcium, and zinc. The preferred bivalent metals are calcium and magnesium. Sodium (which forms monovalent salts) did not work well.

An ethylene bis-stearamide (Advawax 280 of Carstab), metallic stearates, a polypropylene wax and a maleated polpropylene wax were found to be ineffective.

The ethylene polymer is a carrier in the invention concentrate. The other components of the invention concentrate can be described as being dispersed in the ethylene polymer. The waxes are dispersants.

The phrase "ethylene polymer" as used herein includes homopolymers of ethylene and copolymers of ethylene and at least one other non-ethylene monomer. Such copolymers contain at least 50 weight percent of ethylene (based upon the total weight of the copolymer). Examples of the useful olefinic comonomers are 1-butene, 1-hexene, 1-octene and mixtures thereof.

A copolymer of ethylene and acrylic acid is outside of the scope of the phrase "ethylene polymer" as used herein.

The ethylene polymer is preferably a linear polyethylene, preferably having a density of 0.935 or less. The ethylene polymer should be a high molecular weight ethylene polymer relative to the wax. The ethylene polymer must have a molecular weight of at least 20,000 and preferably of 25,000 or more.

Optionally, the invention concentrate can contain up to about 10 weight percent of titanium dioxide (normally about 1 to about 10 weight percent), preferably about 2 to about 4 weight percent, and most preferably about 2 weight percent of $TiO_2$, based upon the total weight of the invention concentrate. The optimum weight ratio of titania to fluorescent pigment is about 2.5 to 1. The titanium dioxide should be of pigment or technical quality. The titania can be anatase or rutile. The titanium dioxide has a very high hiding power, but the titanium dioxide apparently absorbs very little in the excitation region and in the emission region of the fluorescent dye in the fluorescent pigment. The combination of titanium dioxide and the fluorescent pigment produces very intense opaque colorations of high luminosity, even with low comparative levels of the titanium dioxide.

The process for preparing the low plate-out fluorescent pigment concentrate involves:

(I) dry blending components (A), (B), (C), (D) and (E), preferably using high intensity mixing conditions, but however not subjecting the pigment particle surfaces to such high shear so as to materially effect the color characteristics of the pigment particles; and (II) melt mixing the dry blended mixture at a temperature of 425° F. or lower and optionally forming the melt-mixed material into a form useful for fabrication (or incorporation into polyolefins which are to be molded into articles). Preferably the forming of the melt-mixed material involves the steps of:

(a) forming the melt-mixed materials into strands;
(b) cooling the strands; and
(c) pelletizing the strands.

The temperature during extrusion should not exceed 425° F.

In formulating the invention concentrate the ingredients are preferably in powder form and are in dry form.

The invention fluorescent pigment concentrates are dispersed in polyolefin in order to form molded polyolefin articles containing fluorescent pigments. Any conventional dispersion or incorporation means, such as, a mixer, can be used.

The dispersions of polyolefin and fluorescent pigment concentrate are molded, using any conventional molder, into molded articles. The polyolefin is preferably polyethylene or polypropylene, as good results are obtained with both. Copolymers of linear polyethylene with monomers, such as, 1-butene, 1-hexene and 1-octene, can also be used.

Generally sufficient invention concentrate should be used to provide a concentration of from about 0.25 to about 10 weight percent (based on the total weight of the final plastic product) of fluorescent pigment in the final plastic product.

The polyethylene compositions used to form the final polyolefins products can contain the usual additives, such as, heat and/or light stabilizers. Some material which act as external polyolefin lubricants may adversely effect the plate-out characteristics.

EXAMPLE

| BASIC FORMULATION: | |
|---|---|
| Polyethylene Resin | 46% |
| Fluorescent Pigment | 35% |
| Filler (equal to or less than two microns average particle size) | 10% |
| $TiO_2$ | 2% |
| Silcron G-100 | 2% |
| Wax | 5% |

Note:
Inorganic material like barium sulfate or various clays.

MIXING PROCEDURE:
1. Weigh-out ingredients into high-intensity mixer.
2. Mix on medium speed for 1 minute 3. Discharge material EXTRUSION PROCEDURE:
1. Set temperatures no higher than 425° F.
2. Extrude into strands
3. Run strands through water bath to cool
4. Run cooled strands through a pelletizer PLATE-OUT TEST:
1. Place 5.0 g. of concentrate onto polished press plates.
2. Put plates into press set at no more than 375° F.
3. Apply enough pressure to get a press-out of about 20 mils.
4. Remove plates and cool in water bath
5. Remove pressed material and visually evaluate residue deposited onto plate.
6. Rating system:
   1. Excellent (no plate-out)
   2. Good (very little plate-out)
   3. Moderate plate-out
   4. Bad plate-out
   5. Very bad plate-out The concentrates rating as OK in this work are rated no higher than a two. A rating of 3 is marginal, and ratings of 4 and 5 are considered to be unacceptable. All others are considered to have too much plate-out.

The test results are given in the following table.

TABLE 1

| WAX$^{(a)}$ | POLYMER$^{(b)}$ | MW$^{(c)}$ | STATUS (RANK)$^{(d)}$ | AN$^{(e)}$ | SALT |
|---|---|---|---|---|---|
| 6A | PE | 1100 | OK (1) | N.A. (f) | N.A. |
| 629 | OXIDIZED PE | 1500 | OK (1) | 16 | N.A. |
| 540A | EAA | 2000 | OK (2) | 0 | N.A. |
| 201 | EAA | 5000 | MARGINAL (3) | 40 | Ca |
| 201 (repeat) | EAA | 5000 | OK (1.5-2) | 40 | Ca |
| 206 | EAA | 5000 | MARGINAL (3) | Nil | Ca |
| 280 | EAA | 5000 | OK (1) | Nil | Zn |
| 291 | EAA | 5000 | MARGINAL (3) | 40 | Zn |
| 266 | EAA | 5000 | NO (4) | Nil | Na |
| 262A | EAA | 5000 | NO (4) | 40 | Na |
| PP-230 | PP | | NO (5) | N.A. | N.A. |
| EP-43 | MALEATED PP | | NO (5) | N.A. | N.A. |

Notes:
$^{(a)}$All but the last two from ALLIED CHEMICAL; the last two from EASTMAN
$^{(b)}$PE = Polyethylene; EAA = ethylene acrylic acid polymer; PP = polypropylene
$^{(c)}$Molecular Weight
$^{(d)}$Ranked on a scale from 1-5, with 1 best and 5 worst
$^{(e)}$AN = Acid number
$^{(f)}$N.A. = Not applicable

What is claimed is:

1. A low plate-out fluorescent pigment concentrate consisting essentially of:
   (A) from about 5 up to about 40 weight percent of a fluorescent pigment, based upon the total weight of the fluorescent pigment concentrate;
   (B) about 5 to about 20 weight percent of an inert inorganic filler, based upon the total weight of the fluorescent pigment concentrate, said inert inorganic filler having an average particle size of about 2 microns or less;
   (C) a minimum of 2 up to about 10 weight percent of silica gel or a precipitated silica, based upon the total weight of the fluorescent pigment concentrate;
   (D) from about 1 to about 10 weight percent of an organic polymer selected from the group consisting of (i) an oxidized polyethylene wax, (ii) an unoxidized polyethylene wax, (iii) a low molecular weight ethylene acrylic acid copolymer, (iv) a bivalent metal salt of (iii), and (v) a combination of at least two of (i), (ii), (iii) and (iv), based upon the total weight of the fluorescent pigment concentrate; and
   (E) the remainder being an ethylene polymer up to 50 weight percent, based upon the total weight of the fluorescent pigment concentrate, the molecular weight of the ethylene polymer being substantially higher than the molecular weight of the oxidized or unoxidized polyethylene wax.

2. The fluorescent pigment concentrate of claim 1 wherein about 20 to about 38 weight percent of the fluorescent pigment is present.

3. The fluorescent pigment concentrate of claim 1 wherein the fluorescent pigment is a member of the series of heat-stable fluorescent pigments.

4. The fluorescent pigment concentrate of claim 1 wherein about 10 to about 15 weight percent of the inert organic filler is present.

5. The fluorescent pigment concentrate of claim 1 wherein the inert organic filler is precipitated barium sulfate or Buca Clay, which is a type of aluminum silicate.

6. The fluorescent pigment concentrate of claim 1 wherein about 2.0 to about 10 weight percent of a silica gel or a precipitated silica is present.

7. The fluorescent pigment concentrate of claim 1 wherein the silica gel is an aerogel synthetic particle silica or the precipitated silica.

8. The fluorescent pigment concentrate of claim 1 wherein the organic polymer is an unoxidized polyethylene wax.

9. The fluorescent pigment concentrate of claim 1 wherein the organic polymer is an oxidized polyethylene wax.

10. The fluorescent pigment concentrate of claim 1 wherein the organic polymer is a low molecular ethylene acrylic acid copolymer.

11. The fluorescent pigment concentrate of claim 1 wherein the inert inorganic filler has an average particle size of about 1 micron or less.

12. The fluorescent pigment concentrate of claim 1 wherein the organic polymer is a bivalent metal salt of an oxidized polyethylene wax, or a low molecular ethylene acrylic acid copolymer.

13. The fluorescent pigment concentrate of claim 1 wherein the bivalent metal is zinc or magnesium.

14. The fluorescent pigment concentrate of claim 1 wherein also up to about 10 weight percent of titanium dioxide, based upon the total weight of the fluorescent pigment concentrate, is present.

15. Process for preparing the low plate-out fluorescent pigment concentrate, consisting essentially of:
   (A) from about 5 up to about 40 weight percent of a fluorescent pigment;
   (B) about 5 to about 20 weight percent of an inert inorganic filler, having an average particle size of about 2 microns or less;
   (C) a minimum of 2 up to about 10 weight percent of silica gel or a precipitated silica;
   (D) from about 1 to about 10 weight percent of an organic polymer selected from the group consisting of (i) an oxidized polyethylene wax, (ii) an unoxidized polyethylene wax, (iii) a low molecular weight ethylene acrylic acid copolymer, (iv) a bivalent metal salt of (iii), and (v) a combination of at least two of (i), (ii), (iii) and (iv); and (E) the remainder being an ethylene polymer, having a molecular weight substantially higher than the molecular weight of the oxidized or unoxidized polyethylene wax, up to 50 weight percent; comprising the steps of:

(I) dry blending components (A), (B), (C), (D) and (E);

(II) melt mixing the dry blended mixture at a temperature of 425° F. or lower, and optionally forming the melt-mixed material into a form useful for fabrication.

16. The process of claim 15 wherein dry blending step (I) is conducted using high-intensity mixing, but however not subjecting the surfaces of the fluorescent pigment particles to such high shear so as to materially effect the color characteristics of the pigment particles.

17. The process of claim 15 wherein the forming of the melt-mixed material involves the steps of:
(a) forming the melt-mixed material into strands;
(b) cooling the strands; and
(c) pelletizing the strands.

* * * * *